United States Patent
McElwain et al.

[11] 3,710,473
[45] Jan. 16, 1973

[54] METHOD OF MANUFACTURING A HEAT EXCHANGER

[75] Inventors: Merle G. McElwain, York, Pa.; Kenneth J. Miller, Peoria, Ill.

[73] Assignee: Caterpillar Tractor Co., Peoria, Ill.

[22] Filed: June 28, 1971

[21] Appl. No.: 157,169

[52] U.S. Cl.............29/157.3 R, 29/157.4, 29/471.1, 29/501, 29/DIG. 4
[51] Int. Cl............................................B21d 53/02
[58] Field of Search..........29/157.3 R, 157.4, 202 D, 471.1, 29/471.3, 501, DIG. 4

[56] References Cited

UNITED STATES PATENTS

| | | | |
|---|---|---|---|
| 1,420,182 | 6/1922 | Cleveland | 29/157.4 X |
| 2,157,918 | 5/1939 | Rankin | 29/DIG. 4 |
| 2,520,821 | 8/1950 | Woods et al. | 29/157.3 R X |
| 3,259,003 | 7/1966 | Griffin | 29/157.3 R UX |
| 3,349,465 | 10/1967 | LaPan et al. | 29/157.3 R UX |

Primary Examiner—Charles W. Lanham
Assistant Examiner—Donald C. Reiley, III
Attorney—Charles M. Fryer et al.

[57] ABSTRACT

A method for manufacturing a heat exchanger comprises the steps of forming holes in a metal tube sheet in a desired pattern, placing a sheet of brazing foil over the tube sheet, piercing the foil with a plurality of punches aligned with the tube sheet holes, thereby staking the brazing foil segments through the tube sheet holes, pressing the tube ends through the tube sheet holes and foil segments, and heating the end of the assembly until the brazing foil melts.

4 Claims, 6 Drawing Figures

PATENTED JAN 16 1973 3,710,473
SHEET 1 OF 2
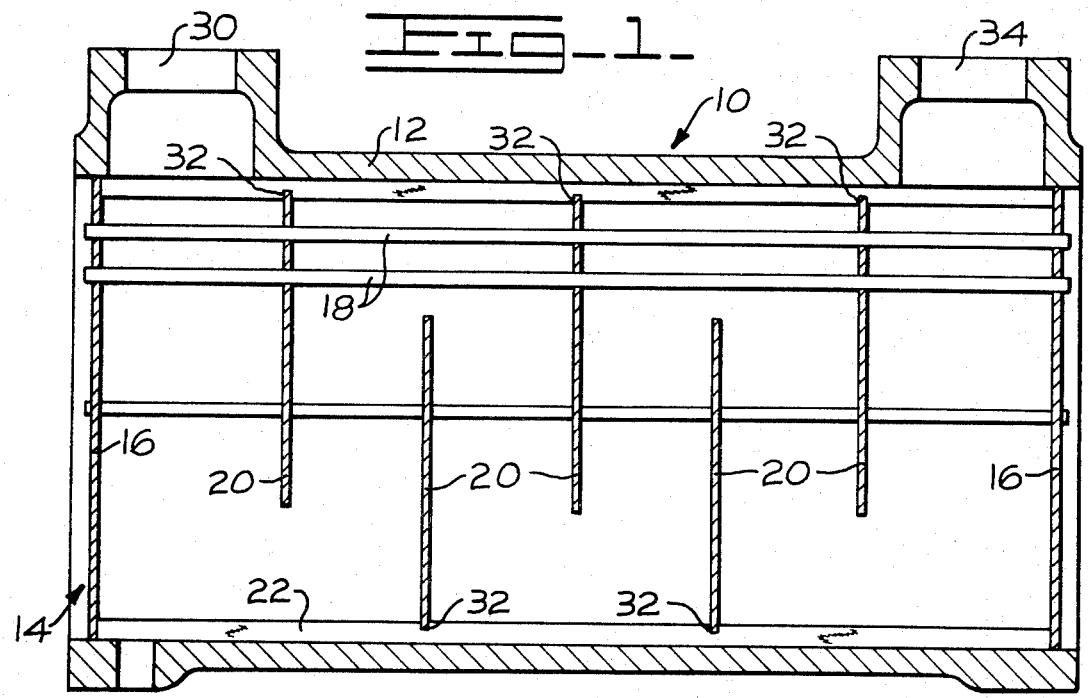
Fig-1-
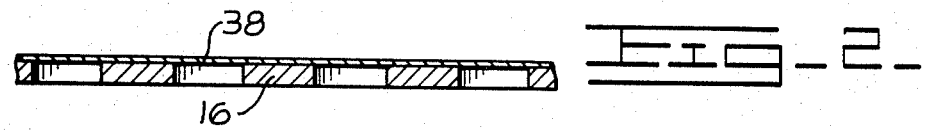
Fig-2-
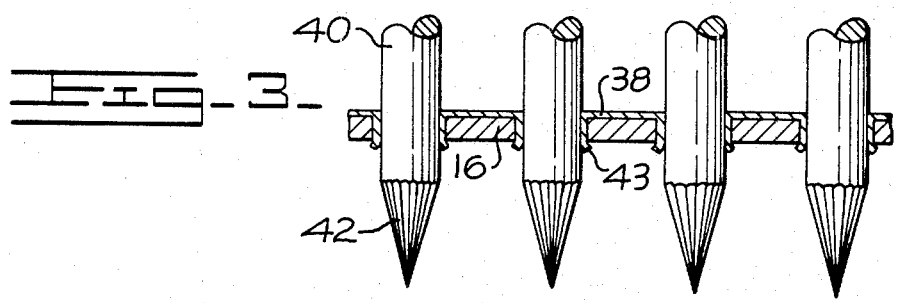
Fig-3-
Fig-4-
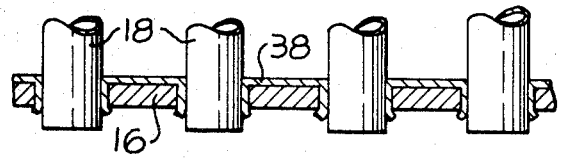
INVENTORS
MERLE G. McELWAIN
KENNETH J. MILLER
BY
ATTORNEYS

METHOD OF MANUFACTURING A HEAT EXCHANGER

BACKGROUND OF THE INVENTION

Many different types of heat exchangers are in operation wherein fluid-carrying tubes are arranged in spaced parallel relationship within the exchangers. A second fluid is directed through the exchanger in a manner designed to provide maximum contact of the fluid with the tubes, resulting in a transfer of heat from the hotter to the cooler fluid. Such heat exchangers include radiators, air-to-oil transmission coolers, plate-type coolers and many others. One specific type of heat exchanger, referred to as a "liquid-to-liquid shell-and-tube exchanger," comprises a plurality of tubes held in a matrix by tube sheets through which the tube ends project. The tube ends are sealed into the tube sheets by a number of methods including rolling, brazing or welding. The tube sheets in turn are fixed within a heat exchanger shell in fluid tight relationship by brazing or welding.

Manifolds at the ends of the shell communicate fluid to the tubes. Generally, the cooling fluid is directed longitudinally inside the tubes, while the fluid to be cooled is directed across the outer surfaces of the tubes. Baffles are spaced at desired locations within the heat exchanger to insure that the main flow stream of the fluid to be cooled is nearly perpendicular to the tube lengths, and that the fluid to be cooled repeatedly contacts the tubes.

Materials frequently used in manufacturing heat exchangers include cast iron, steel, brass, copper, stainless steel and aluminum, and selection of the material for a given application depends on the desired inherent heat transfer characteristics, corrosive environment, temperature, galvanic action and economics.

One problem frequently encountered in the construction of heat exchangers of the shell-and-tube type is in maintaining a leak-proof connection between the tubes and the tube sheets. In a typical exchanger, as many as five hundred individual tubes may be used, requiring formation of one thousand leak-proof connections considering that both ends must be sealed.

One method of fastening the individual tube ends in the tube sheets comprises expanding the tube ends into the tube sheet holes by rolling. This mechanical bond is often unsatisfactory because the tube may work loose from the tube sheet after prolonged operation with repeated contraction and expansion of the elements.

Another method of securing the tube ends in the tube is by welding. Welding the tube end connections may be satisfactory if all of the materials used are similar. However, the high temperature used in welding may create residual stresses in the normally thin-walled tubes, causing failure during operation.

Conventional brazing processes are largely performed by hand and considered to be an individual art. Thus, there is a large variance in cooler quality and consistency on a day-to-day, individual-to-individual basis.

Irregularity in heating and applying the brazing materials is likely to cause local elongation of individual tubes. When the braze solidifies, this freezes the tube in an extended position and creates a state of residual stress, which can result in reduced fatigue life.

BRIEF SUMMARY OF THE INVENTION

The present invention provides a method of constructing heat exchangers which overcomes the foregoing problems, and which assures precisely constructed, uniform and leak-proof braze joints between the tubes and the tube sheets. This method also utilizes a minimum amount of brazing material and is readily adaptable to automated manufacture of the heat exchangers.

In the process of the present invention, the brazing material is provided in the form of a thin sheet of brazing foil which is superimposed on a tube sheet having holes formed therein to receive the ends of cooling tubes. A plurality of punches, preferably having pointed and serrated tips, are then pushed through the foil and into the holes in the tube sheet. The foil overlying the tube sheet holes is thus pushed into the holes and formed around the periphery thereof by the punch.

The punch is then withdrawn and the tube ends are inserted in the dressed tube sheet holes and the resulting tube bundle is inserted into a heat exchanger shell. The end of the exchanger assembly is then heated, as in a quartz lamp furnace, which causes the foil to melt and flow around the tubes, filling the spaces between the tubes and the tube sheet hole perimeters. The radiant heat from the furnace draws the melted brazing foil through the space between the tubes and the holes in the tube sheet by capillary action, forming a bead around each tube. An additional bead of brazing material is placed around the perimeter of the tube sheet and serves to braze the tube sheet to the shell. A suitable manifold is then attached to each end of the shell to complete the heat exchanger.

It is, therefore, an object of this invention to make a superior quality heat exchanger by using an improved method of manufacturing and assembly.

A further object of this invention is to provide a method of assembly of heat exchangers by brazing, wherein the amount of brazing material used is carefully controlled.

A still further object of this invention is to provide a uniform heating in assembling heat exchangers to prevent undesired distortion and warping which may result in excessive stresses.

An additional object of this invention is to make possible the automated manufacture of heat exchangers.

BRIEF DESCRIPTION OF THE DRAWINGS

FIG. 1 is a longitudinal sectional view of a shell-and-tube type heat exchanger which may be constructed by the method of the present invention.

FIG. 2 is an enlarged, sectional view of part of a tube end sheet with a sheet of brazing foil employed in the present invention superimposed thereon.

FIG. 3 is a view of the tube sheet and brazing foil shown in FIG. 2 showing a combination punching and staking operation.

FIG. 4 is a view of the tube sheet and brazing foil shown in FIG. 2 showing the heat exchanger tubes assembled in the tube sheet after the punching and staking operation.

DESCRIPTION OF THE PREFERRED EMBODIMENT

Figure 5:
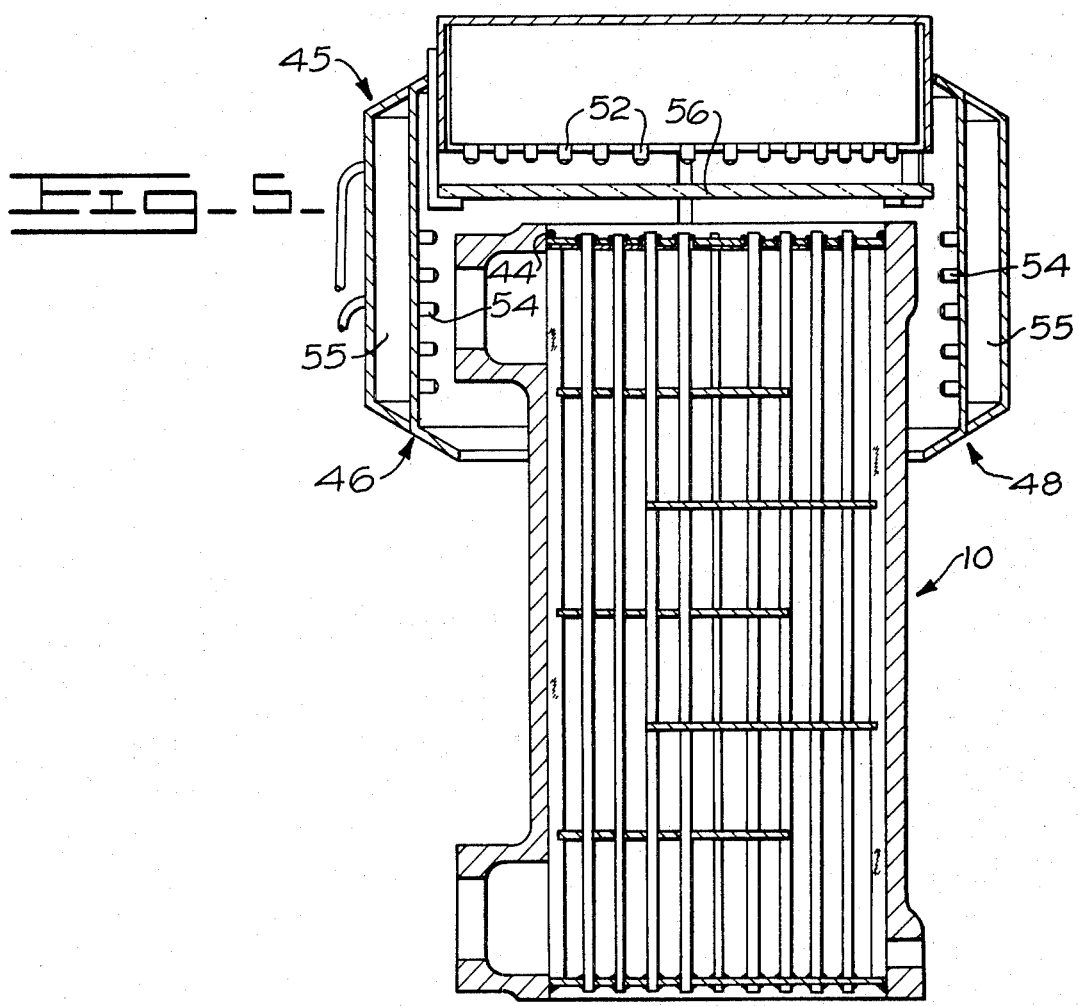
FIG. 5 is a sectional view of an assembled heat exchanger as it would appear in a quartz lamp heater prior to brazing thereof.

Referring to FIG. 1, a shell-and-tube type heat exchanger assembly is shown generally at 10 as comprising a shell 12 and a tube bundle assembly 14 disposed within the shell. The tube bundle comprises a pair of circular tube end sheets 16 disposed at each end of the shell, a plurality of tubes 18 extending between the tube sheets, a series of spaced segmented baffles 20, and a plurality of notched tie bars 22 holding the baffle plates.

In operation, the fluid to be cooled is normally introduced through an inlet 30 in the shell and flows in a tortuous path guided by baffles 20 to an outlet 34. The cooled fluid then is returned to the engine, transmission, brake or the like for future use.

The cooling medium is introduced into tubes 18 through a manifold, not shown, and flows longitudinally from one end of the heat exchanger to the other. It is then discharged through a manifold, not shown, attached to the opposite end of the exchanger. Baffles 20 are maintained in their desired longitudinal location by means of notches provided in tie bars 22, one of which is shown at 32. It is an important factor, in successful heat exchanger design, that the clearance between the baffles and the tube outside diameter be minimal to insure that there is little leakage around the tube. This will help increase the turbulence of the cooled fluid and thus improve heat transfer. It is essential that the connection between the tube and the tube sheet, and the tube sheet and the shell be bonded tightly to prevent any mixing or contamination of the two fluids used in the heat exchanger.

The preferred steps followed in assembling the heat exchanger, according to the present invention, include cutting copper tubes 18 to the desired length and inserting the tubes through segmented baffles 20 having pre-formed holes in any desired pattern. Tie bars 22, which maintain baffle spacing, are then assembled over baffles 20 by means of notches 32 which engage the periphery of the baffles.

Tube sheets 16 are preferably formed from flat stock by blanking the outside diameter slightly smaller than the inside diameter of the shell. The tube sheets contain a plurality of holes, which may be formed by conventional punching means. The pattern for the holes in the tube sheet will obviously be identical to the aforementioned pattern of the segmented baffles.

The tube sheets are cleaned and as shown in FIG. 2, a sheet of brazing foil 38 having a thickness of approximately 0.001 to 0.006 inches and an outside diameter slightly smaller than that of the tube sheet is positioned on top of a tube sheet in a conventional press.

As shown in FIG. 3, a series of punches 40 are arranged in the same pattern as the tube holes in the tube sheet to have their pointed, straight-serrated tips 42 pushed through the brazing foil and into the holes in the tube sheet. Each serrated punch tip 42 is instrumental in forcing the brazing foil through the holes in the tube sheet and forming angular segments 43 which curl to form a star pattern on the opposite side of the tube sheet. It has been found that an included cone angle of 30° on the serrated punch end causes the foil to curl in an optimum manner, forming a tightly staked connection. The star pattern foil segments act to center the tube ends in the tube sheet holes.

The hole size and the brazing foil thickness are selected to insure a metal-to-metal fit when the preassembled tube ends are pressed into the tube sheet and the intermediate foil segments, as shown in FIG. 4. It has been found that for optimum brazing characteristics the tube ends should extend through the tube sheet a distance not to exceed approximately one-sixteenth inch.

The brazing foil is also commercially available in the form of a tape having an adhesive backing. It has been found that such brazing tape can be applied directly to the tube sheets with good results.

The assembly is placed in the shell 12, after which the tube ends and the tube sheet are fluxed in a conventional manner. A ring of brazing metal 44, having a circumference approximately equal to the outside diameter of the tube sheet, is paced on the end to be brazed, in contact with both the tube sheet and the shell. The purpose of this ring is to braze the tube sheet 16 to the shell 12.

One method of heating the assembly in a uniform, closely controlled manner to permit brazing of the tubes to the tube sheet and the tube sheet to the shell is by using a quartz lamp unit 45, as shown in FIG. 5. Hinged members 46 and 48 are disposed around the shell with appropriate clearances to insure that the proper temperature is maintained during the brazing operation and open outwardly to permit the heat exchanger to be placed and removed. A plurality of quartz lamps 52 and 54 in the top and side heating units, respectively, provide close temperature control for the brazing in an efficient and uniform manner. Approximately 1,300°F. is a satisfactory temperature when the shell is constructed of grey cast iron and the tubes and tube sheets are copper. A typical annealed brazing foil which is satisfactory in this purpose is composed of an alloy of 45 percent silver, 15 percent copper, 16 percent zinc, 18 percent cadmium and 6 percent miscellaneous constituents such as iron and lead. Another brazing foil composition which is satisfactory is sold under the trade name "Sil-Fos." Appropriate cooling means as at 55 using circulating water or air may be employed to keep the unit at reasonably low temperatures for effective equipment maintenance and operator comfort. A glass plate 56 acts as a shield to prevent spatter from the flux from being deposited on the upper quartz lamps 52 which has an adverse effect on lamp life.

Figure 6:
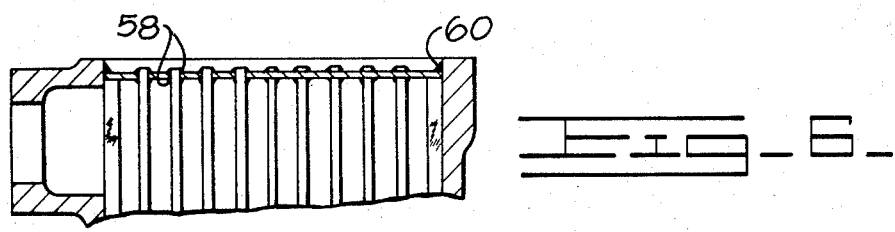
FIG. 6 is a fragmentary sectional view of one end of the exchanger following the brazing operation.

Referring to FIG. 6, when the heating unit is operative, brazing foil 38 melts, travels by capillary action from the inner surface of the tube sheets 16 and completely surrounds the tubes, forming fillets 58 there around on both the upper and lower surfaces of the tube sheet to provide a fluid-tight and pressure-resistant joint. The metal brazing ring 44 is melted simultaneously to form a bead 60 around the periphery of the tube sheet and the shell, also providing a fluid-tight joint. The brazing foil 38 on the under side of the tube sheet also provides a tinning effect on the under surface and prevents the melting ring 44 from running down the sidewalls of the shell.

It is to be understood that in reference herein to brazing and brazing foil, such terms are used in a general sense only and are not to be limited to what is technically defined as brazing and brazing foil, but is to be understood as including any process, such as soldering and welding, wherein two or more parts are joined by melting a fusible metal foil.

What is claimed is:

1. A method for manufacturing a heat exchanger wherein at least one tube extends between and through tube sheets disposed at each end of the heat exchanger comprising the steps of:

forming a series of holes in a tube sheet in a designated pattern;

positioning a sheet of brazing foil upon said tube sheet;

punching said sheet of brazing foil to stake segments of said brazing foil through said holes;

pressing one end of a tube through each of said holes; and, melting said brazing foil to braze said tube sheet to said tubes in fluid-tight relationship.

2. The method of claim 1 wherein the melting step comprises:

placing at least one end of the assembly in a quartz lamp heater, and energizing the quartz lamp heater until the brazing foil melts and forms a fillet around each tube on each side of the tube sheet.

3. The method of claim 1 further comprising assembling said tubes and tube sheet within a shell.

4. The method of claim 3 further comprising placing a ring of brazing metal around the perimeter of the tube sheet and adjacent to the shell, and brazing said tube sheet to said shell.

* * * * *